INVENTOR.
Howard M. Wiles
BY
Morsell & Morsell
ATTORNEYS

Dec. 13, 1960          H. M. WILES          2,964,028
OVER-SPEED AIR SHUT-OFF VALVES FOR INTERNAL COMBUSTION ENGINES
Filed May 20, 1959          3 Sheets-Sheet 2
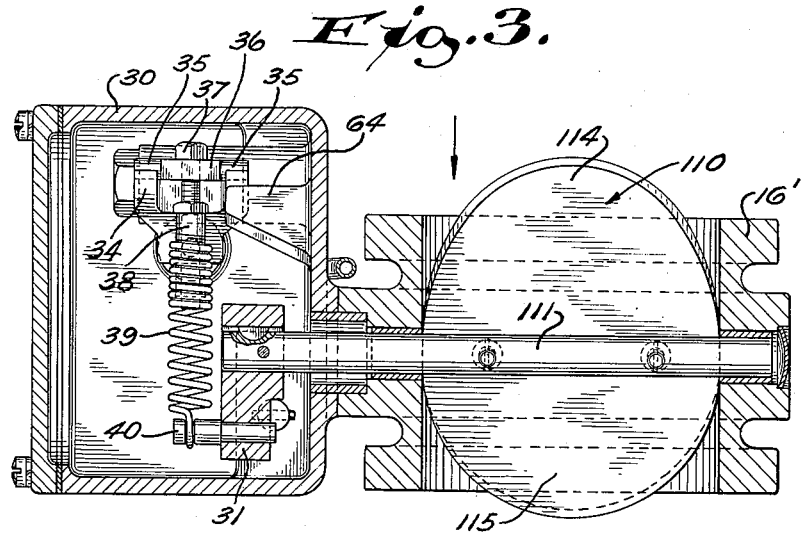
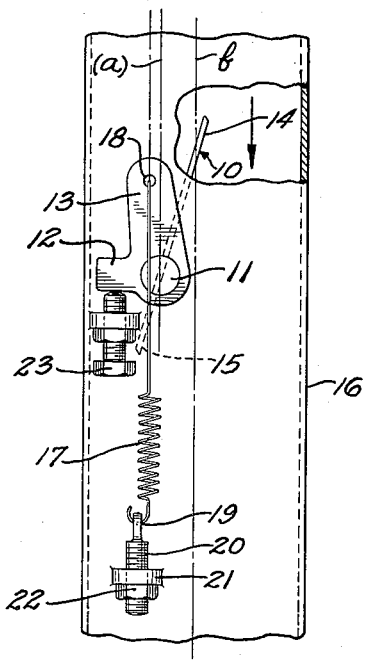
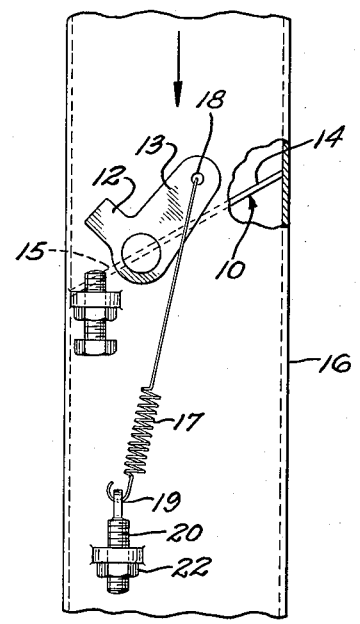
INVENTOR.
Howard M. Wiles
BY
Morsell & Morsell
ATTORNEYS.

Dec. 13, 1960  H. M. WILES  2,964,028
OVER-SPEED AIR SHUT-OFF VALVES FOR INTERNAL COMBUSTION ENGINES
Filed May 20, 1959  3 Sheets-Sheet 3
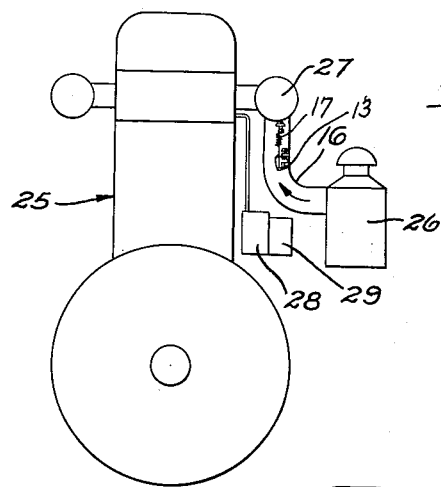
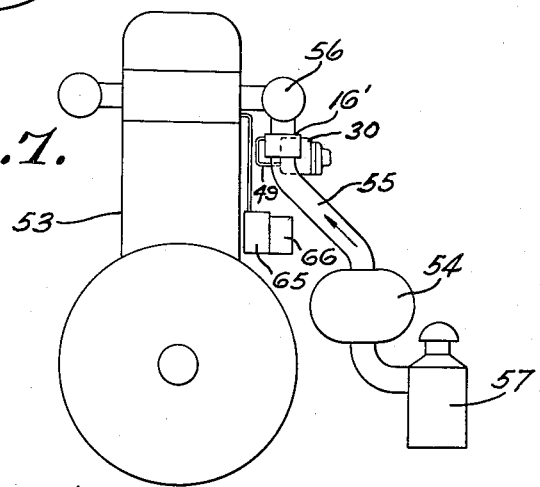
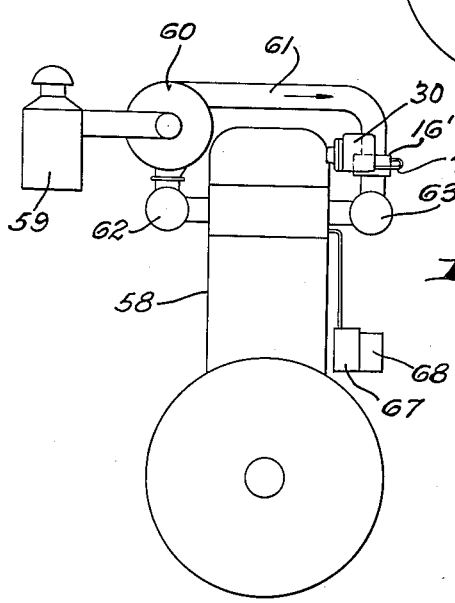
INVENTOR.
Howard M. Wiles
BY
Morsell & Morsell
ATTORNEYS.

United States Patent Office 2,964,028
Patented Dec. 13, 1960

2,964,028

OVER-SPEED AIR SHUT-OFF VALVES FOR INTERNAL COMBUSTION ENGINES

Howard M. Wiles, Waukesha, Wis., assignor to Waukesha Motor Company, Waukesha, Wis., a corporation of Wisconsin Filed May 20, 1959, Ser. No. 814,429

11 Claims. (Cl. 123—103)

This invention relates to improvements in over-speed air shut-off valves for internal combustion engines.

In the use of internal combustion engines and particularly diesel engines which normally run on full throttle, it sometimes happens that there is an accidental over-speed above the top governed speed of the engine. Sometimes this is due to a failure of the main governor, and other times it may be due to a sluggish governor when the load is released suddenly, or to other causes.

It is a general object of the present invention to provide an improved safety device operable to automatically shut off the supply of combustion air in case of such accidental over-speed to thereby stop the engine.

A further object of the invention is to provide as one form of the invention a device particularly adapted for use on supercharged or turbosupercharged diesel engines, which is adapted to stop the engine at approximately the same relatively high shut-off speed regardless of the percent of load between idle and full load.

A more specific object of the invention is to provide a device adapted for use with supercharged or turbo-supercharged diesel engines as above described wherein there is a novel pressure compensator which prevents the device from unnecessarily shutting off the engine at too low a speed, and which insures that no matter what the load on the engine the device will only operate to shut off the engine at the same relatively high speed where safety demands such shut-off.

With the above and other objects in view, the invention consists of the improved over-speed air shut-off valve for internal combustion engines, and all its parts and combinations, as set forth in the claims, and all equivalents thereof.

In the accompanying drawings, illustrating several embodiments of the invention, in which the same reference numerals designate the same parts in all of the views:

Fig. 3 is a vertical sectional view taken approximately on the line 3—3 of Fig. 2;

Fig. 4 is a fragmentary view of an air inlet line leading to the manifold of a diesel engine showing a modified form of the invention, part of the pipe being broken away, and the valve being shown in open position;

Fig. 5 is a view similar to Fig. 4 illustrating the apparatus of Fig. 4 in closed position;

Fig. 6 is a schematic elevational view of a naturally aspirated diesel engine equipped with the device of Figs. 4 and 5;

Fig. 7 is a digrammatic elevational view of a diesel engine with a mechanical drive, positive displacement supercharger showing the use of a shut-off device with pressure compensator of the type illustrated in Figs. 1, 2 and 3; and Fig. 8 is a similar diagrammatic view of a turbo-supercharged diesel engine equipped with the improved automatic air shut-off device with the pressure compensator.

Figure 2:
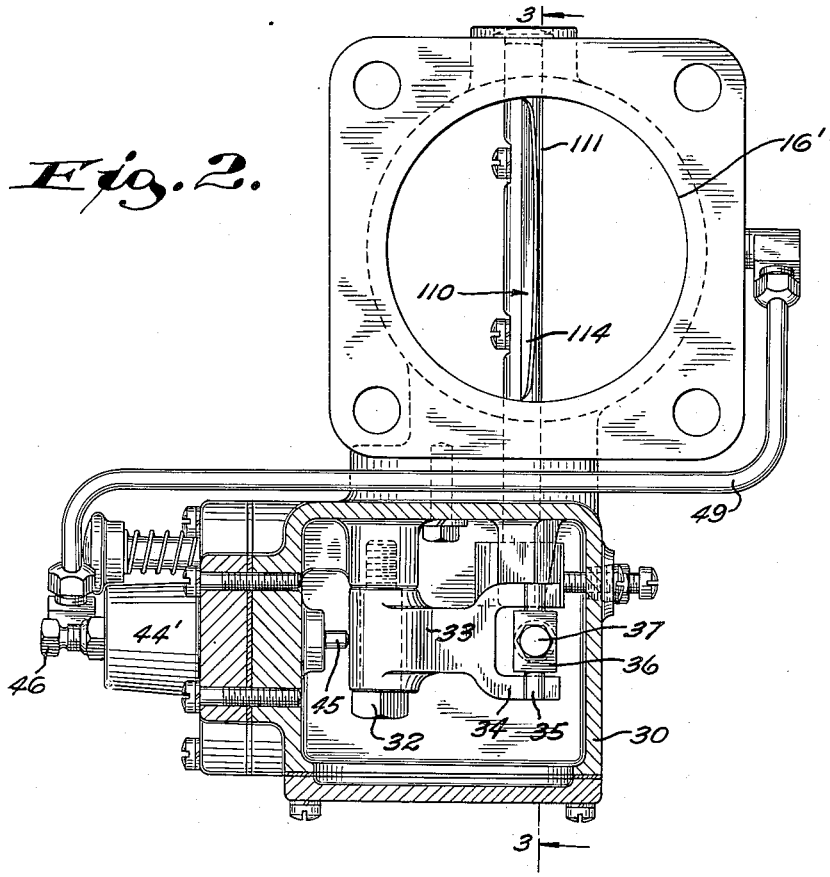
Fig. 2 is a sectional view taken on the line 2—2 of Fig. 1.

Referring more particularly to the drawings, the simple form of the invention is illustrated in Figs. 4 and 5. This device is suitable for use in naturally aspirated diesel engines where there is no supercharging or turbo-supercharging, and hence no problems resulting from the amount of air being proportional to the load. This engine is equipped with the usual governor and is designed to run at full throttle.

Referring to Fig. 4, the numeral 10 designates a butterfly valve mounted on a rotatable stem 11, which stem has an externally projecting end to which a bellcrank lever having arms 12 and 13 is secured. The stem 11 is offset on the line (a) from the center line (b) of the air inlet pipe, as shown in Fig. 4. With this mounting arrangement, one side 14 of the butterfly disc is longer than the other side 15 which unbalances the air pressure on the two sides of the stem 11. Inasmuch a the longer side 14 of the butterfly disc is located on the upstream side of the stem 11, the air flow in the tube 16 tends to act on the long side of the disc to close the butterfly.

The butterfly valve, however, is normally maintained in the open position of Fig. 4 by a coiled spring 17 having one end connected as at 18 to the arm 13 of the bellcrank, and having its other end connected as at 19 to the upper end of a screw 20 which is adjustable in an eye 21 on the pipe 16, through manipulation of an adjustment nut 22.

Fig. 6 shows one type of application of the device of Figs. 4 and 5 to a naturally aspirated diesel engine 25 having the usual air cleaner 26 and intake manifold 27, the improved device being in the air line 16 leading to the intake manifold, and there being the usual fuel pump 28 and governor 29 set to provide for operation at full throttle with a predetermined top governed speed.

In operation of this form of the invention, the spring 17 is adjusted through the nut 22 to apply sufficient force to hold the butterfly valve in the open position of Fig. 4 at the top governed speed. However, should the engine speed accidentally rise above its top governed speed due to a failure of the main governor, to a sluggish governor action, or due to some accidental cause, then the resulting increased airflow in the tube 16 will raise the unbalanced pressure on the butterfly disc 10 sufficiently to overcome the spring 17. The butterfly disc will then start moving toward closing position and, as soon as the spring connection point 18 is moved past dead center line (a), then the spring 17 will instantly snap the valve disc 10 to the closing position of Fig. 5. The adjustment screw 23 may be manipulated to initially adjust the over center position of the spring connection point 18, when in the open position of Fig. 4. The shut-off of the inlet air will starve the engine causing it to stop. It cannot be restarted until the butterfly is reset back to the position of Fig. 4.

In operating supercharged diesel engines of the type shown in Fig. 7 or turbo supercharged engines as shown in Fig. 8, the form of the invention of Figs. 4 and 5 might cause shut-off at too low an engine speed due to the fact that the air pressure is proportional to the load. In order to render the device suitable for use on super-charged or turbo supercharged engines, the form of the invention of Figs. 1, 2 and 3 has been devised. This arrangement provides a pressure compensator so that no matter what the load the automatic shut-off will take place at the same relatively high speed, and will not shut off at a low speed where there is no safety problem.

Figure 1:
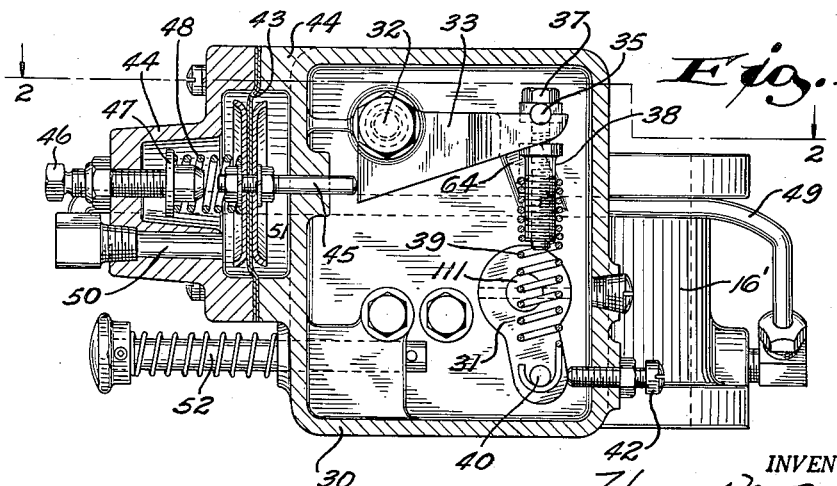
Fig. 1 is a side view of the improved device with the control box shown in vertical section.

Referring to Figs. 1 to 3, the air inlet line portion 16' has a butterfly valve disc 110 therein having a relatively long side 114 and a relatively short downstream side 115.

The disc is mounted for rotation with a stem 111, with the stem eccentrically connected to the disc, as shown in Fig. 3. The stem is journaled through the air inlet pipe fitting 16' and has one end projecting rotatably into a control box 30, there being a valve lever 31 rigidly connected to said end within the box 30. The box is suitably connected to the pipe fitting 16'. Also pivoted at 32 within the box is a triangular trip control lever 33 having a forked outer end 34. The fork pivotally supports trunnions 35 from a pivot block 36. A spring tension adjusting screw 37 extends rotatably through the block 36 and is adjustably threaded in an internally threaded bore of a sleeve member 38 which also has external threading coacting with the convolutions at the upper end of a spring 39, the adjustable sleeve thereby forming a spring rate screw. By turning the sleeve 38 in or out of the upper end of the spring 39, the number of active coils can be varied. The lower end of the spring is hooked onto a pin 40 at the lower end of the valve lever 31. Swinging movement of the valve lever over dead center toward the adjacent side of the casing may be adjustably limited by a set screw 42.

In this form of the invention a suitable movable pressure sensitive device is required to take care of the pressure compensation needed with supercharged or turbo supercharged engines. This pressure compensator may take the form of a flexible diaphragm 43, preferably of suitable synthetic material, which is clamped between a cup-shaped extension 44 on the casing and a diaphragm cover member 44'. The diaphragm has a lengthwise adjustable, inwardly projecting, central pin 45 which is engageable with the adjacent end of the trip control lever 33 to urge the trip control lever to pivot upwardly when the pin 45 presses thereagainst. A diaphragm adjustment screw 46 is threaded into the end of the cover and its inner end carries a spring seat member having a collar 47 against which the outer end of a spring 48 bears. The inner end of the spring bears against the outer side of the diaphragm 43.

An air line 49 has one end in communication with the interior of the fitting 16' on the downstream side of the stem 111, and has its other end communicating with a port 50 leading to the diaphragm chamber 51 on the external side of the diaphragm. A spring tensioned plunger 52 is provided for reset purposes, its inner end being alined with the lower portion of the valve lever 31.

Fig. 7 shows the application of the form of the invention of Figs. 1–3 to a diesel engine 53 equipped with a mechanical drive, positive displacement supercharger 54, the device 16' being shown in the inlet line 55 leading from the supercharger to the intake manifold 56, there being the usual air cleaner 57, and there being the usual fuel injection pump 65 and governor 66. Fig. 8 discloses the device of Figs. 1 to 3 installed in a turbo supercharged diesel engine 58 having the usual air cleaner 59 and having a turbo charger 60 connected in a line 61 between the exhaust manifold 62 and the intake manifold 63. There is also the usual fuel injection pump 67 and governor 68.

In use of the type of device of Figs. 1 to 3, if there is an accidental overspeed above top governed speed, the air pressure will tend to act on the unbalanced butterfly valve disc 110 in the same manner heretofore described in conjunction with Figs. 4 and 5. Movement of the valve 110 to closing position is, however, resisted by the over dead-center connection 40 of the spring 39. Should the engine speed accidentally rise above the top governed speed, then the increased air flow in the line 55 of Fig. 7, or 61 of Fig. 8 will raise the unbalanced pressure on the butterfly disc 110 sufficiently to overcome the action of the spring 39. The butterfly disc will then start moving toward closing position, and as soon as the point 40 is moved past dead center then the spring 39 will instantly snap the valve disc to closing position.

If no pressure-sensitive compensating device such as the diaphragm 43 were employed, the engine might be cut off at too low a speed on a supercharged or turbo supercharged diesel such as shown in Figs. 7 and 8. This is due to the fact that the amount of air pumped in these devices is proportional to the load. However, in order to be reliable, an overspeed shut-off device must shut off at substantially the same engine speed regardless of the load. With the present invention, when the air pressure rises in the air inlet pipe 55 or 61 of Figs. 7 or 8, this rise in pressure is transmitted through the by-pass pressure line 49 to the diaphragm chamber to act on the diaphragm 43 and cause the pin 45 to act against the end of the triangular trip control lever 33. This will cause upward pivoting movement of the outer end of the lever 33 to increase the tension of the spring 39. Thus a greater amount of force is required to be exerted on the long side 114 of the butterfly disc in order to snap it over dead center. Thus increases in air pressure delivered by the supercharger or turbo supercharger due to increases in the load are compensated for by making it proportionately harder for the air pressure in the lines 55 and 61 to snap the butterfly valves past dead center. By proper adjustments the butterfly valve may be made to stop the engine at approximately the same relatively high shut-off speed regardless of the percent of load between idle and full load, and this is set sufficiently high so that it only shuts off when the speed is sufficiently above top governed speed as to affect safety.

In initially adjusting the device the spring rate is set by turning the sleeve 38 into the upper end of the spring 39 a required number of turns. Then with the pressure line 49 disconnected from the diaphragm housing the spring tension screw 37 is adjusted to adjust the spring tension so that the device will trip at an overspeed condition with no load, making sure that the trip control lever 33 is seated on the internal stop 64. Next, the balance spring adjusting screw 46 in the diaphragm cover 44 is turned in until the trip control lever 33 is moved away from the stop 64. The screw is then backed out again until the lever 33 just comes back to rest on the stop. Pressure line 49 is then re-connected and the engine is tested at no load, at part load and at full load conditions with corrections being made to get a predetermined setting so that the engine will shut off at a predetermined relatively high r.p.m. regardless of whether it is running at no load, part load or at full load.

In use of the device of Figs. 1 to 3, after a shut-off has occurred, the engines of Figs. 7 and 8 cannot again be started until the reset plunger 52 is pushed in to kick the lower end of the lever 31 over dead center to the position of Fig. 1.

It is apparent from the above that with the form of the invention of Figs. 1 to 3 inclusive there is no danger of the engine being cut off at too low a speed when using a supercharger or a turbo supercharger, and it is apparent that the device will therefore only operate in case of an accidental overspeed above top governed speed of the engine.

It is to be understood that the present invention is not to be limited to the exact details of construction shown and described for obvious modifications will occur to persons skilled in the art.

What I claim is:

1. In an internal combustion engine having a combustion air inlet line, a butterfly valve in said line having a stem which is offset from the center of the valve to provide a long side and short side, a lever arm on said valve stem, and spring means connected between said air inlet line and an outer portion of said arm and positioned to normally hold the parts in a position past dead center with respect to the valve stem to maintain the valve in open position during normal operation of the engine, said long side of the valve being on the upstream side of the valve stem and at a selected angle to respond to increased air flow as a result of accidental overspeed of the engine over a predetermined r.p.m. to pull the lever arm and spring means to the other side of said dead center and cause closing of the valve to stop the flow of air to the engine, and means for adjustably limiting said selected angle for the valve.

2. In a diesel engine adapted to operate at a predetermined top safe speed and having a supercharger, and having a combustion air inlet line, a shut-off valve in said line, spring means urging said valve to open position during normal operation of the engine, said valve having a portion in said line positioned to be responsive to increased air flow as a result of accidental overspeed over top governed speed to overcome the resistance of said spring means and move the valve to shutoff position to stop the flow of air to the engine, pressure operated compensator means responsive to air pressure from said supercharger for varying the tension of said spring means in direct proportion to air pressure to prevent closing of the valve at a speed lower than said predetermined top safe speed when air delivered by the supercharger is increased due to increase in the load.

3. In a diesel engine adapted to operate at a predetermined top safe speed and having a supercharger, and having a combustion air inlet line, a butterfly valve in said line having a stem which is offset from the center of the valve to provide a long side and short side, a lever arm on said valve stem, and spring means connected between said inlet line and an outer portion of said arm positioned to normally hold the parts in a position past dead center with respect to the valve stem to maintain the valve in open position during normal operation of the engine, said long side of the valve being on the upstream side of the valve stem and at a selected angle to respond to increased air flow as a result of accidental overspeed of the engine over said predetermined top safe speed to pull the lever arm and spring to the other side of said dead center and cause closing of the valve to stop the flow of air to the engine, means for adjustably limiting said selected angle for the valve, and pressure operated compensator means responsive to air pressure from said supercharger for varying the tension of said spring means in direct proportion to air pressure to prevent closing of the valve at a speed lower than said predetermined top safe speed when air delivered by the supercharger is increased due to increase in the load.

4. In a diesel engine adapted to operate at a predetermined top safe speed and having a supercharger, and having a combustion air inlet line, a butterfly valve in said line having a stem which is offset from the center of the valve to provide a long side and short side, a lever arm on said valve stem, and spring means connected between said inlet line and an outer portion of said arm positioned to normally hold the parts in a position past dead center with respect to the valve stem to maintain the valve in open position during normal operation of the engine, said long side of the valve being on the upstream side of the valve stem and at a selected angle to respond to increased air flow as a result of accidental overspeed of the engine over said predetermined top safe speed to pull the lever arm and spring to the other side of said dead center and cause closing of the valve to stop the flow of air to the engine, means for adjustably limiting said selected angle for the valve, and pressure operated compensator means including a diaphragm responsive to air pressure from said supercharger for varying the tension of said spring means in direct proportion to air pressure to prevent closing of the valve at a speed lower than said predetermined top safe speed when air delivered by the supercharger is increased due to increase in the load.

5. In an internal combustion engine adapted to operate at a predetermined top safe speed and having a supercharger, and having a combustion air inlet line, a butterfly valve in said inlet line having a stem which is offset from the center line of the valve member to provide a long side and a short side, said long side being on the upstream side of said stem and positioned so that the valve is urged toward closing position by air pressure from the supercharger, a lever arm on said stem, a pivotally mounted trip control lever, spring means supported on the outer end of said trip control lever and connected at its other end to said valve stem lever arm and positioned to normally hold the lever arm in a position past dead center with respect to the valve stem to maintain the valve in open position during normal operation of the engine, pressure operated compensator means engageable with said trip control lever to tilt the same in a direction to increase the tension of said spring when pressure is exerted on said compensator, a pressure line leading from said air inlet line to said compensator so that the latter is responsive to air pressure from said supercharger to vary the tension of said spring means in direct proportion to said air pressure to prevent closing of the valve at a speed lower than said predetermined top safe speed when the air delivered by the supercharger is increased due to increase in the load, whereby said valve is closed only when the engine speed exceeds said predetermined top safe speed.

6. In an internal combustion engine adapted to operate at a predetermined top safe speed and having a supercharger, and having a combustion air inlet line, a butterfly valve in said inlet line having a stem which is offset from the center line of the valve member to provide a long side and a short side, said long side being on the upstream side of said stem and positioned so that the valve is urged toward closing position by air pressure from the supercharger, a lever arm on said stem, a pivotally mounted trip control lever, spring means supported on the outer end of said trip control lever and connected at its other end to said valve stem lever arm and positioned to normally hold the lever arm in a position past dead center with respect to the valve stem to maintain the valve in open position during normal operation of the engine, pressure operated compensator means engageable with said trip control lever to tilt the same in a direction to increase the tension of said spring when pressure is exerted on said compensator, a pressure line leading from said air inlet line to said compensator, and means for adjusting said compensator and spring means so that the compensator is responsive to air pressure from said supercharger to vary the tension of said spring means in direct proportion to said air pressure to prevent closing of the valve at a speed lower than said predetermined top safe speed when the air delivered by the supercharger is increased due to increase in the load, whereby said valve is closed only when the engine speed exceeds said predetermined top safe speed.

7. In an internal combustion engine adapted to operate at a predetermined top safe speed and having a supercharger, and having a combustion air inlet line, a compensator box connected externally to said air inlet line, a butterfly valve member in said inlet line having a stem which is offset from the center line of the valve member to provide a long side and a short side, said long side being on the upstream side of said stem, said stem having an end projecting into said compensator box, a lever arm on said projecting stem end in said box, a trip control lever pivoted in said compensator box, a spring connecting said trip control lever with said valve stem lever arm and positioned to normally hold the arm in a position past dead center with respect to the valve stem to maintain the valve in open position during normal operation of the engine, said compensator box having a pressure chamber, a pressure line connecting said air inlet line with said pressure chamber, and a movable pressure operated member in said chamber having externally projecting means engageable with said trip control lever to vary the tension of the spring in direct proportion to the air pressure in the pressure chamber to prevent closing of the valve at a speed lower than said predetermined top safe speed when the air delivered by the supercharger is increased due to an increase in the load, whereby said valve is closed only when the engine speed exceeds said predetermined top safe speed.

8. In an internal combustion engine adapted to operate at a predetermined top safe speed and having a supercharger, and having a combustion air inlet line, a compensator box connected externally to said air inlet line, a butterfly valve member in said inlet line having a stem which is offset from the center line of the valve member to provide a long side and a short side, said long side being on the upstream side of said stem, said stem having an end projecting into said compensator box, a lever arm on said projecting stem end in said box, a trip control lever pivoted in said compensator box, a spring connecting said trip control lever with said valve stem lever arm and positioned to normally hold the arm in a position past dead center with respect to the valve stem to maintain the valve in open position during normal operation of the engine, said compensator box having a pressure chamber, a pressure line connecting said air inlet line with said pressure chamber, and a movable diaphragm in said chamber having an externally projecting pin engageable with said trip control lever to vary the tension of the spring in direct proportion to the air pressure in the pressure chamber to prevent closing of the valve at a speed lower than said predetermined top safe speed when the air delivered by the supercharger is increased due to an increase in the load, whereby said valve is closed only when the engine speed exceeds said predetermined top safe speed.

9. In an internal combustion engine adapted to operate at a predetermined top safe speed and having a supercharger, and having a combustion air inlet line, a compensator box connected externally to said air inlet line, a butterfly valve member in said inlet line having a stem which is offset from the center line of the valve member to provide a long side and a short side, said long side being on the upstream side of said stem and said stem having an end projecting into said compensator box, a lever arm on said projecting stem end in said box, a trip control lever pivoted in said compensator box, a tension screw pivotally carried by the outer end of said trip lever, an externally threaded spring rate sleeve into which said tension screw is threaded, a spring threaded on said spring rate sleeve and connected with said valve stem lever arm and positioned to normally hold the arm in a position past dead center with respect to the valve stem to maintain the valve in open position during normal operation of the engine, said compensator box having a pressure chamber, a pressure line connecting said air inlet line with said pressure chamber, and an adjustable diaphragm in said chamber having an externally projecting pin engageable with said trip control lever to vary the tension of the spring in direct proportion to the air pressure in the pressure chamber to prevent closing of the valve at a speed lower than said predetermined top safe speed when the air delivered by the supercharger is increased due to an increase in the load, whereby said valve is closed only when the engine speed exceeds said predetermined top safe speed.

10. In an internal combustion engine having a combustion air inlet line, a butterfly valve in said line having a stem which is offset from the center of the valve to provide a long side and short side, a lever arm on said valve stem, and spring means connected to an outer portion of said arm and positioned to normally hold the parts in a position past dead center with respect to the valve stem to maintain the valve in open position during normal operation of the engine, said long side of the valve being on the upstream side of the valve stem and at a selected angle to respond to increased air flow as a result of accidental overspeed of the engine over a predetermined r.p.m. to pull the lever arm and spring means to the other side of said dead center and cause closing of the valve to stop the flow of air to the engine, and means for adjustably limiting said selected angle for the valve.

11. In an internal combustion engine having a combustion air inlet line, a butterfly valve in said line having a stem which is offset from the center of the valve to provide a long side and short side, a lever arm on said valve stem, and spring means connected to an outer portion of said arm and positioned to normally hold the parts in a position past dead center with respect to the valve stem to maintain the valve in open position during normal operation of the engine, said long side of the valve being on the upstream side of the valve stem and at a selected angle to respond to increased air flow as a result of accidental overspeed of the engine over a predetermined r.p.m. to pull the lever arm and spring means to the other side of said dead center and cause closing of the valve to stop the flow of air to the engine.

References Cited in the file of this patent
UNITED STATES PATENTS

| | | |
|---|---|---|
| 1,528,479 | Hansen | Mar. 3, 1925 |
| 1,584,933 | Handy et al. | May 18, 1926 |
| 2,223,821 | Grannan et al. | Dec. 3, 1940 |
| 2,731,001 | Dickson et al. | Jan. 17, 1956 |

FOREIGN PATENTS

| | | |
|---|---|---|
| 104,940 | Australia | Sept. 8, 1938 |